United States Patent [19]

Boyd

[11] Patent Number: 5,031,400
[45] Date of Patent: Jul. 16, 1991

[54] HIGH TEMPERATURE TURBINE ENGINE STRUCTURE

[75] Inventor: Gary L. Boyd, Tempe, Ariz.

[73] Assignee: Allied-Signal Inc., Morris Township, N.J.

[21] Appl. No.: 282,786

[22] Filed: Dec. 9, 1988

[51] Int. Cl.⁵ ............................................. F02C 7/32
[52] U.S. Cl. ............................ 60/39.320; 416/198 A; 416/241 B
[58] Field of Search ............... 464/136; 403/369, 378, 403/380; 416/198 R, 198 A, 170 R, 241 B; 60/39.36, 39.32

[56] References Cited

U.S. PATENT DOCUMENTS

| | | | |
|---|---|---|---|
| 2,660,399 | 11/1953 | Robinson et al. | 416/198 A |
| 2,743,080 | 9/1956 | Feilden | 416/198 A |
| 3,070,348 | 12/1962 | Vogel | 416/198 A |
| 3,680,979 | 8/1972 | Hansen et al. | 416/198 A |
| 3,941,506 | 3/1976 | Robb et al. | 416/198 A |
| 4,123,199 | 10/1978 | Shimizu et al. | 416/241 B |

FOREIGN PATENT DOCUMENTS

| | | | |
|---|---|---|---|
| 1284689 | 12/1968 | Fed. Rep. of Germany | 416/198 A |
| 870124 | 3/1942 | France | 416/241 B |
| 2402 | 1/1982 | Japan | 416/198 A |
| 57004 | 4/1983 | Japan | 416/198 A |

OTHER PUBLICATIONS

Stoddart, D. E., "Using Silicon Nitride for Gas Turbine Engines", Gas Turbine International (Jul.-Aug., 1972):16-19.

Primary Examiner—Louis J. Casaregola
Assistant Examiner—Timothy S. Thorpe
Attorney, Agent, or Firm—Terry L. Miller; James W. McFarland; Robert A. Walsh

[57] ABSTRACT

A high temperature turbine engine includes a rotor portion having axially stacked adjacent ceramic rotor parts. A ceramic/ceramic joint structure transmits torque between the rotor parts while maintaining coaxial alignment and axially spaced mutually parallel relation thereof despite thermal and centrifugal cycling.

12 Claims, 2 Drawing Sheets

HIGH TEMPERATURE TURBINE ENGINE STRUCTURE

The U.S. Government has rights in the present invention pursuant to Contract No. DEN3-167 issued and funded by the Department of Energy (DOE), and administered by the National Aeronautics and Space Administration (NASA).

TECHNICAL FIELD

The present invention is in the field of high temperature turbine engine structure. Particularly, the present invention is directed to structure of a high temperature turbine engine composed of both metallic and ceramic components.

BACKGROUND OF THE INVENTION

A long-recognized need in the turbine engine art has been to attain higher operating temperatures in order to achieve a greater thermodynamic efficiency and an increased power output per unit of engine weight. Ideally, a turbine engine should operate with stoichiometric combustion in order to extract the greatest possible energy value from the fuel consumed. However, the temperatures resulting from stoichiometric and even near-stoichiometric combustion are beyond the endurance capabilities of metallic turbine engine components. Consequently, as the turbine engine art has progressed, an ever greater emphasis has been placed upon both enhanced cooling techniques and the development of temperature and oxidation resistant metals for use in components of the engine which are exposed to the highest temperatures. That is, cooling techniques and high temperature metals have been developed for each of combustion chambers, turbine stator nozzles, and turbine blades. This quest has led to the development of elaborate cooling schemes for all of these components as well as to classes of nickel-based "super alloy" metals which may be cast using directionally solidified or single crystal techniques. All in all, the quest for higher operating temperatures in a turbine engine fabricated of metallic components has led to a still increasing complexity and expense in the making of the engine.

An alternative approach to the attainment of higher operating temperatures in a turbine engine has been recognized. This approach involves the use of high-strength ceramic components in the engine. Ceramic components are better able than metals to withstand the high temperature oxidizing environment of a turbine engine. However, the term "high strength" in connection with ceramic structures must be viewed in context. While many ceramic materials exhibit superior high temperature strength and oxidation resistance, ceramics have historically been difficult to employ in turbine engines because of a comparatively low tensile fracture strength and a low defect tolerance. Consequently, a long-recognized need has been for the development of hybrid ceramic/metallic structures which utilize the characteristics of each material to best advantage in order to allow combustion in a turbine engine to take place closer to or at the stoichiometric level.

An additional problem with the use of ceramics in a turbine engine arises when the ceramic material is used to form a turbine disk structure. Particularly in an axial flow turbine having more than one turbine stages, the plural disks defining the stages of the turbine are formed as separate pieces. These disks then must be axially stacked and interconnected in torque transmitting relation while preserving coaxial alignment and axially spaced parallelism of the disks despite thermal and centrifugal cycling. Conventional metallic turbine structures employ a curvic coupling between adjacent turbine disks. With the development of ceramic materials and application of these materials to turbine disks the use of conventional curvic coupling structure was attempted. However the curvic coupling structure when fabricated of ceramic material consistently failed because of fracturing of the ceramic curvic teeth. Attempts to modify the conventional curvic structure to allow fabrication with ceramic material were unsuccessful.

SUMMARY OF THE INVENTION

In view of the deficiencies of the conventional turbine engine art, and of the materials of construction and structural techniques available for making such engines, it is a primary object for this invention to provide a rotor structure for a turbine engine which includes axially stacked ceramic disk portions coupled in torque transmitting corotational relation.

More particularly, it is an object for this invention to provide a turbine engine having a rotor member including axially stacked ceramic disk portions which cooperatively define a joint structure providing both torque transmission and coaxial alignment between the ceramic disk portions.

Accordingly, the present invention provides a ceramic/ceramic coupling structure comprising: a ceramic first member having a respective axially disposed first face circumscribing a rotational axis of said first member, said first member defining on said first face a circumferentially arrayed first plurality of radially extending grooves, a ceramic second member having a respective axially disposed second face circumscribing a respective rotational axis coaxial with the rotational axis of said first member and confronting said first face, said second member defining on said second face a circumferentially arrayed second plurality of radially extending grooves matching circumferentially and in axial juxtaposition with said first plurality of grooves, a plurality of radially elongate ceramic members each one received in a respective one of said first plurality of grooves and in a matching one of said second plurality of grooves, and means for urging said first member and said second member axially toward one another to trap said radially elongate ceramic members in said grooves, whereby said first member and said second member are maintained both in coaxial and axially spaced parallel relationship and in torque transmitting corotational relation with one another.

An advantage of the present invention is that it provides a turbine engine with a rotor member having stacked ceramic disk portions which are coupled for torque transmitting corotation while also being retained concentrically to one another in axially spaced parallel relation.

The ceramic/ceramic joint structure of the present invention provides both torque transmission and coaxial alignment between axially adjacent ceramic structures cooperatively defining the joint structure. Unlike conventional curvic or modified curvic joint structures when constructed of ceramic material, the present joint structure does not result in large tensile stress concentrations nor in notch tensile failures of the ceramic material.

Additional objects and advantages of the present invention will appear from a reading of the following detailed description of a single preferred embodiment of the invention taken in conjunction with the appended drawing figures.

BEST MODE FOR CARRYING OUT THE INVENTION

Figure 1:
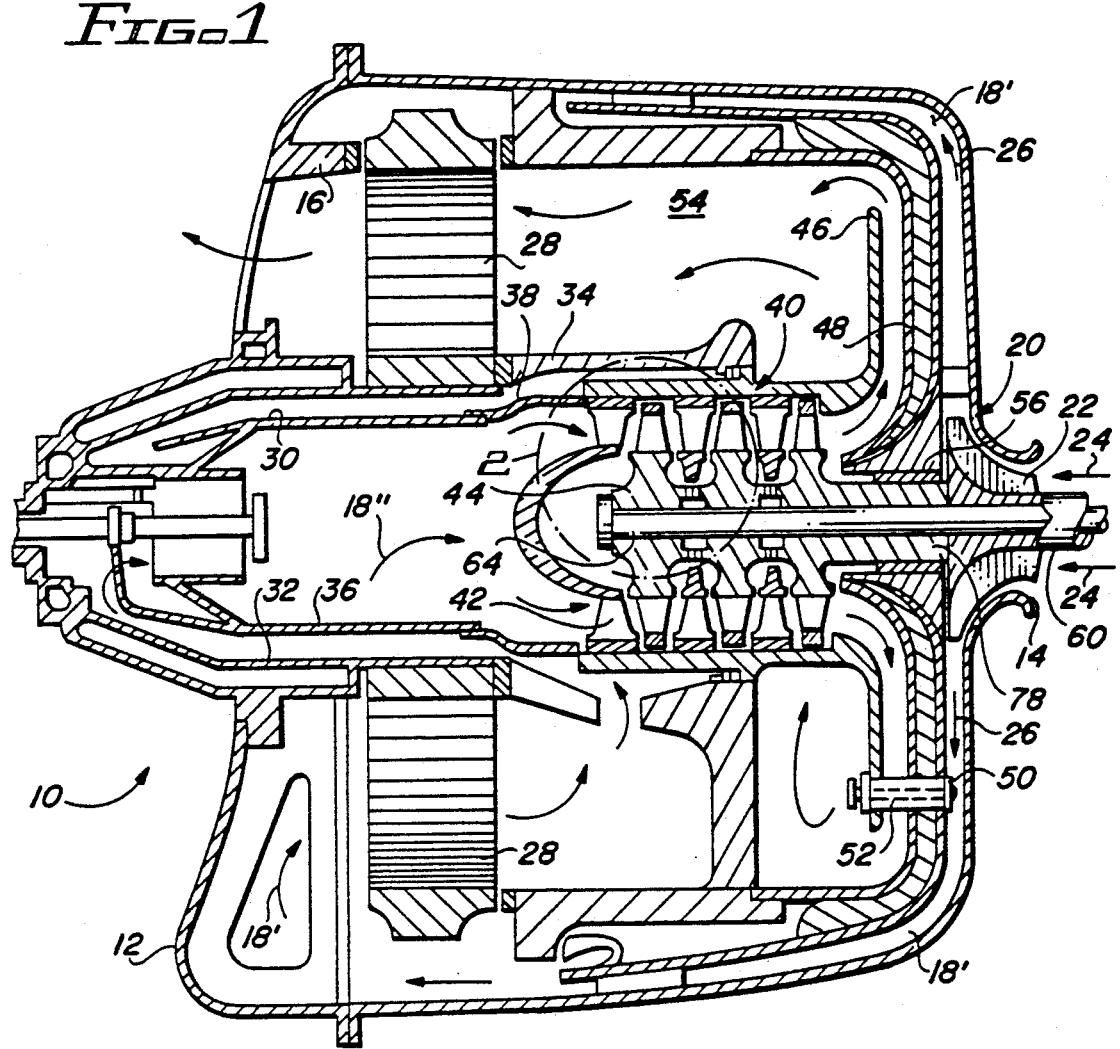
FIG. 1 provides a fragmentary longitudinal view, partly in cross section of a hybrid ceramic/metallic turbine engine embodying the invention.

FIG. 1 depicts a hybrid ceramic/metallic turbine engine 10. The engine 10 includes a housing 12 which defines an inlet 14, an outlet 16, and a tortuous flow path 18 communicating the inlet 14 with the outlet 16 for conveying a flow of fluid therebetween. A hybrid ceramic/ metallic rotor member generally referenced with the numeral 20 is journaled in the housing 12 and cooperates therewith to bound the flow path 18. It will be seen that the rotor member 20 includes a compressor rotor portion 22, rotation of which inducts ambient air via inlet 14, as indicated by arrow 24, and delivers this air pressurized to a flow path section 18' as indicated by arrow 26.

The flow path section 18' leads axially through a segment of somewhat less than 180° of a rotary annular regenerator member 28 which is received in the housing 12. Downstream of the regenerator 28, the flow path 18 leads through an axially extending combustion structure generally referenced with the numeral 30. The combustor structure 30 is fabricated of ceramic material and includes a ceramic outer liner 32 which is supported at one end by an outer transition member 34. A ceramic inner combustion liner 36 is coaxially disposed within the outer liner 32, and is supported at one end on a ceramic transition duct member 38. The flow path 18 leads axially toward the one end of the combustion liner 36, as indicated by arrow 18". Within the transition duct member 38 is disposed a ceramic axial flow turbine section, generally referenced with the numeral 40. The turbine section 40 includes a ceramic stator member 42 and a ceramic turbine rotor portion 44 cooperatively defining the flow path 18.

Downstream of the turbine rotor portion 44, the flow path 18 extends axially and radially outwardly between a pair of spaced apart cooperative ceramic exhaust duct members, respectively referenced with the numerals 46,48. A plurality of hybrid ceramic/metallic fastener members 50 (one of which is visible in FIG. 1) cooperatively engage the one exhaust duct member 46 and the housing 12. A ceramic spacer member 52 received over the fastener members 50 spaces apart the duct members 46,48.

Subsequent to the exhaust duct members 46,48, the flow path 18 leads to an exhaust chamber generally referenced with the numeral 54. A segment of somewhat less than 180° of the ceramic regenerator member 28 is exposed to the exhaust chamber 54. Consequently, the flow path 18 leads once again through the regenerator member 28, and to ambient via the outlet 16.

In order to complete this description of the engine 10, it must be noted that in the combustor 30 fuel is added to the pressurized air flowing from compressor rotor 22 to support combustion. This combustion results in a flow of high temperature pressurized combustion products flowing downstream in the combustor 30, and in flow path 18 subsequent to the combustor. Also, the rotor member 20 is journaled in housing 12 by a journal bearing 56 disposed between the rotor portions 22 and 44. A metallic power output shaft portion 60 (only a portion of which is visible in FIG. 1) of the rotor member 20 extends outwardly of the housing 12.

Figure 2:
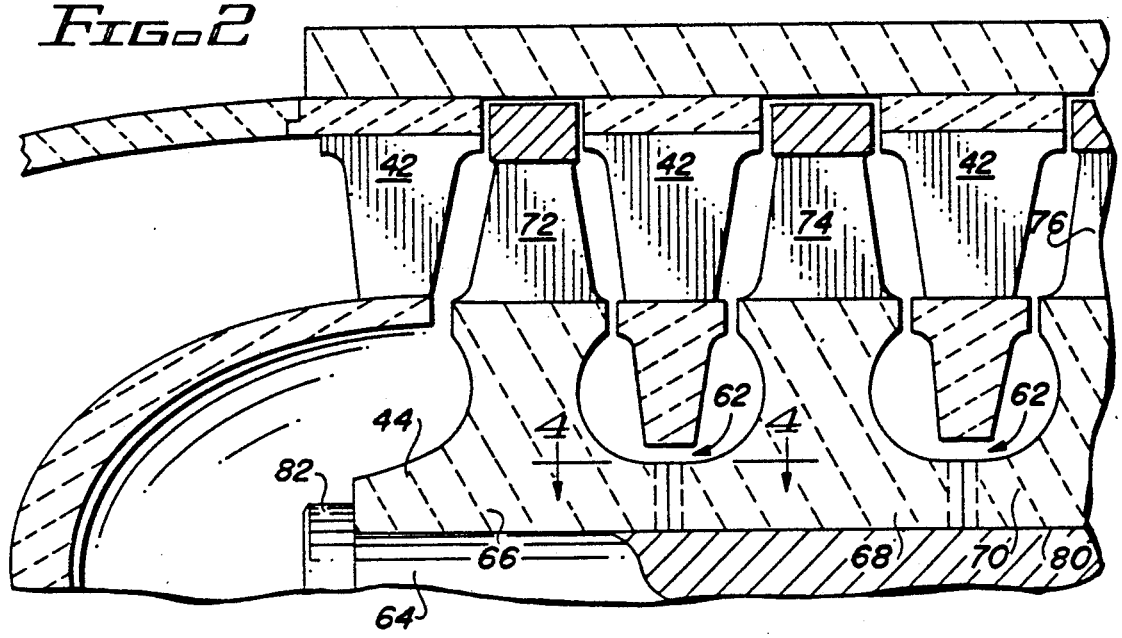
FIG. 2 depicts an enlarged fragmentary cross sectional view of a portion of the engine presented by FIG. 1 with parts thereof omitted for clarity of illustration.
Figure 3:
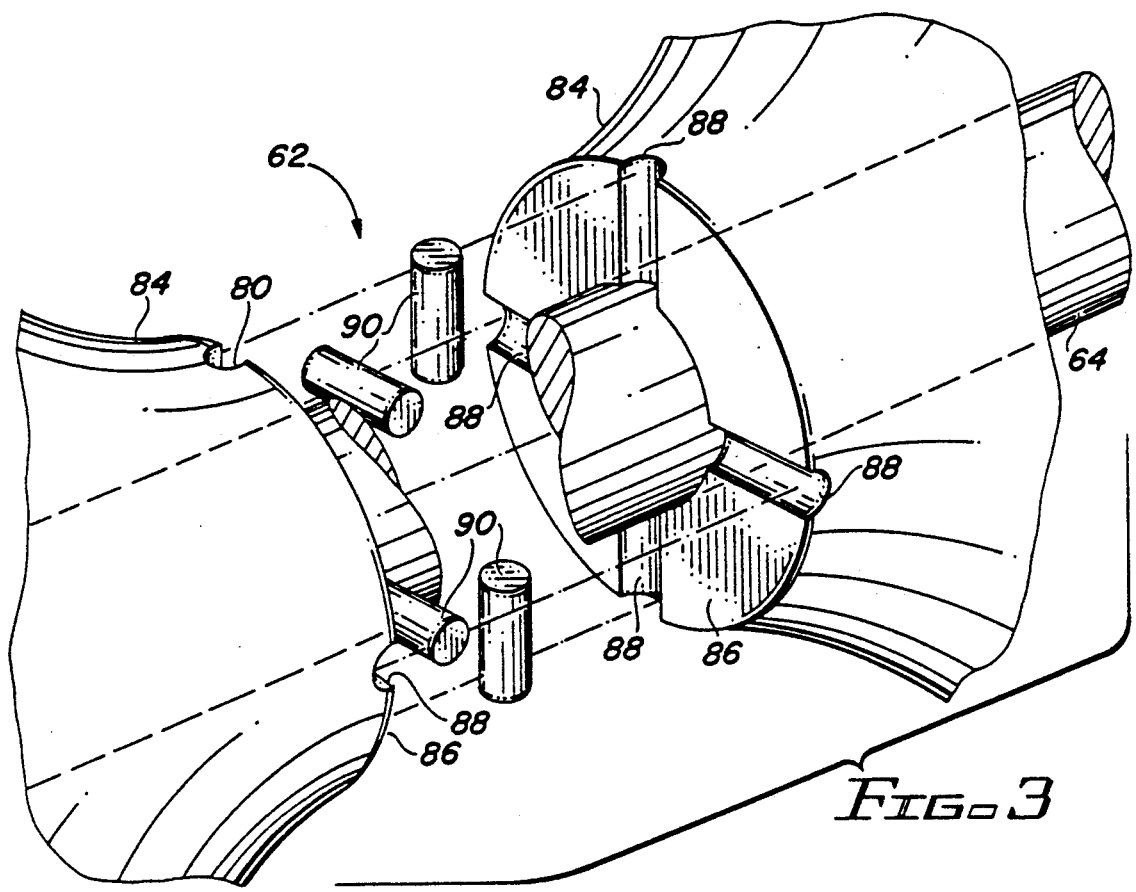
FIG. 3 provides an exploded perspective view of a turbine rotor assembly portion of the turbine engine, with parts thereof omitted or broken away for clarity of illustration.

Viewing now FIGS. 2 and 3 in conjunction, it will be seen that the hybrid ceramic/metallic rotor member 20 includes not only the metallic compressor rotor portion 22, the ceramic turbine rotor portion 44, and metallic power output shaft portion 60 (not visible in FIGS. 2 and 3), but also a plurality of torque transmitting and concentricity retaining coupling structures each generally referenced with the numeral 62, and a single axially extending metallic tie bolt member 64. The coupling structures 62 and tie bolt 64 are cooperative to unite the portions 22, 44 and 60 to define the rotor member 20. In other words, the coupling structures 62 transmit torque between the portions of the rotor member 20 while maintaining coaxial concentricity and axially spaced mutual parallelism of the portions.

The ceramic turbine portion 44 includes three axially stacked individual generally disk-shaped ceramic parts 66, 68, and 70. At their outer periphery, each of the disk parts 66,68,70, define plural respective integral and circumferentially spaced apart radially outwardly extending turbine blade portions 72, 74, and 76. The disk part 70 also includes an axially elongate hub portion 78 (viewing FIG. 1) which is circularly cylindrical in transverse section and defines a journal surface for the bearing 56. Each of the disk parts 66, 68, and 70 define a central through bore, generally referenced with the numeral 80, and through which passes the tie bolt 64. A head part 82 of the tie bolt bears upon the disk part 66 while an opposite end of the tie bolt (not shown) threadably carries a nut (also not shown) bearing on the shaft portion 60. As a result, the tie bolt 64 is loaded in tension while the remainder of the rotor member 20 is loaded in compression.

Viewing FIG. 3, it will be seen in greater detail that each of the adjacent disk parts 66, 68, and 70, as part of the coupling structures 62, define respective axially extending annular boss portions, generally referenced with the numeral 84. The boss portions 84 extend toward one another, but stop short of mutual contact to define respective confronting axially disposed face surfaces, each referenced with the numeral 86. Each of the boss portions 84 also define four radially extending semi-circular grooves 88. The grooves 88 are equally circumferentially spaced apart and precisely match the circumferential spacing of the grooves 88 in the next axially adjacent and confronting boss portion 84. Thus, the confronting grooves 88 are in axial alignment and disposed as cooperative pairs by the confronting bosses 84.

Figure 4:
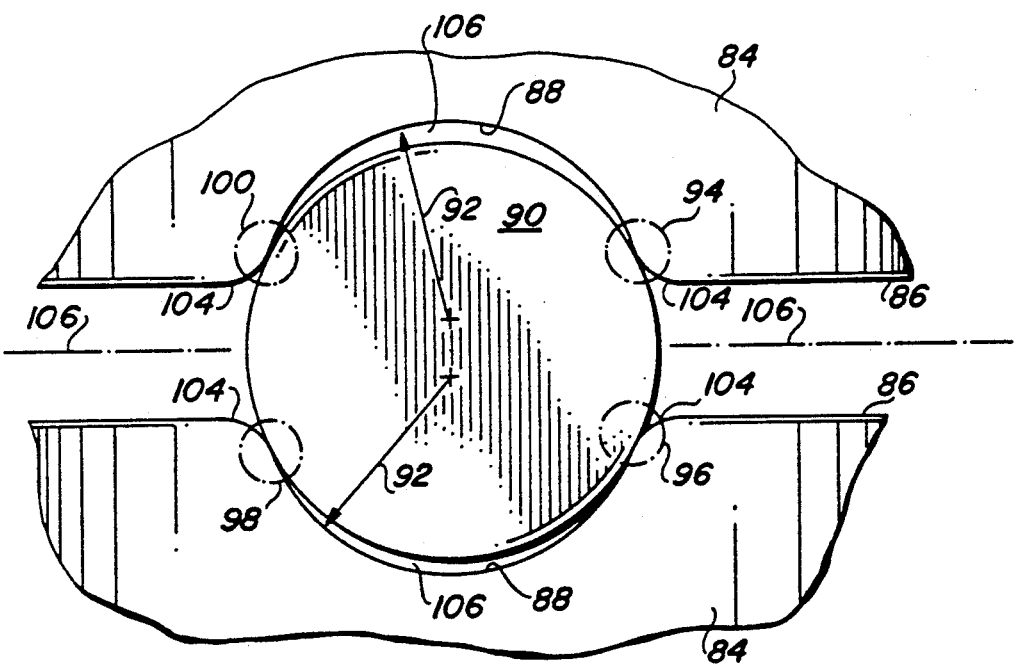
FIG. 4 presents a fragmentary view taken along line 4—4 of FIG. 2.

Disposed in each pair of the matching semicircular grooves 88 and between the confronting boss portions 84 is one of four radially extending elongate and circularly cylindrical ceramic pin members 90. Viewing FIG. 4, it will be seen that the pin members 90 axially space apart the boss portions 84. Such is the case because the grooves 86 are each slightly less than a full semi-circle. Further, the radius 92 of each groove 88 is slightly less than one-half the diameter of each pin 90. As a result, each of the pin members 90 define four radially extending lines of contact 94,96,98 and 100 with the adjacent boss portions 84. The lines of contact 94-100 are disposed proximate to a transverse radial plane 102 equally spaced between the adjacent ceramic disk parts, and are adjacent a radially extending arcuate transition surface, or "round" 104 which blends the groove 88 to the face surface 86.

Because the ceramic material from which the disk parts 66-70, and pins 90 are fabricated, which may be reaction bonded silicone nitride, has virtually no plastic deformation and experiences only very slight elastic deformation under the compressive load provided by tie bolt 64, the pin members 90 do not "bottom" in the grooves 88. In other words, the pin members 90 define an axial clearance 106 with the respective boss portion 84. The clearance 106 also extends circumferentially with respect to the pin member 90 between the adjacent line contacts 94-100 associated with each groove 88.

In view of the above, it is easily seen that the coupling structure 62 is composed of features 84-106, and is preserved in torque transmitting relative position by the axial compressive load provided by the tie bolt 64. It should be noted that metallic compressor rotor portion 22 and metallic power output shaft portion 60 also define a conventional curvic coupling therebetween so that torque from turbine portion 44 may be delivered externally of the engine 10 via the shaft portion 60. Because the lines of contact 94-100 lie closely adjacent to the transverse plane 102, and the pin members 90 do not bottom in the grooves 88, the adjacent disk parts are coupled for torque transmission therebetween entirely without circumferential slack or lost motion therebetween. Also, the disk parts 66-70 are jointed coaxially and in mutually parallel axially spaced relationship. The pin members 90 are clamped between the confronting bosses 84 by the compressive force provided by tie bolt 64. This clamping force is sufficiently high that the pin members cannot escape radially from the grooves 88. Also, because the radius 92 is as large as practicable, and nearly as large as one-half the diameter of pins 90, concentrations of tensile stresses and notch sensitivity of the ceramic material is avoided by the present invention While the present invention has been depicted and described by reference to a single preferred embodiment of the invention, such reference does not imply any limitation upon the invention, and no such limitation is to be inferred. The invention is intended to be limited only by the spirit and scope of the appended claims which provide additional definition of the invention.

What is claimed is:

1. A ceramic/ceramic coupling structure comprising:
   a ceramic first member having a respective axially disposed first face circumscribing a rotational axis of said first member, said first member defining on said first face a circumferentially arrayed first plurality of radially extending grooves,
   a ceramic second member having a respective axially disposed second face circumscribing a respective rotational axis coaxial with the rotational axis of said first member and confronting said first face, said second member defining on said second face a circumferentially arrayed second plurality of radially extending groves matching circumferentially and in axial juxtaposition with said first plurality of grooves,
   a plurality of radially elongate ceramic members each one received in a respective one of said first plurality of grooves and in a matching one of said second plurality of grooves,
   means for urging said first member and said second member axially toward one another to trap said radially elongate ceramic members in said grooves, whereby said first member and said second member are maintained both in coaxial and axially spaced parallel relationship and in torque transmitting operational relation with one another,
   wherein each of said plurality of radially elongate members is circularly cylindrical in cross section,
   wherein each of said first plurality of grooves and said second plurality of grooves is semi-circular in cross section,
   wherein each of said grooves define a respective radius closely approximating but slightly less than one-half the diameter of the respective ceramic radially elongate member trapped therein.

2. The invention of claim 1 wherein each of said ceramic radially elongate members defines two circumferentially spaced radially extending lines of contact with each of the ceramic first member and ceramic second member 3. The invention of claim 2 wherein said radially elongate ceramic members space axially apart said first member and said second member.

4. The invention of claim 3 wherein said lines of contact are disposed as closely as practicable to a transverse radial plane equidistantly between said first member and said second member.

5. The invention of claim 4 wherein said radially elongate ceramic members are everywhere radially spaced from both said first member and said second member with the exception of said lines of contact.

6. The invention of claim 5 wherein each of said first member and said second member define an axially extending central bores, said urging means including an elongate tensile member disposed in said central bore and providing a reactive compressive load to said first and second member urging the latter toward one another.

7. The invention of claim 1 wherein each of said ceramic first member and said ceramic second member define respective axially extending boss portions, said boss portions defining said respective first face and second face.

8. A method of coupling a prior of axially adjacent ceramic rotor members in axially spaced parallel and coaxial torque transmitting relationship, said method including the steps of:
   defining one each of said pair of rotor members an axially disposed face circumscribing the rotational axis thereof;
   forming on each of said pair of faces a respective plurality of circumferentially spaced apart radially extending grooves which are positionally matching one face to the other;
   axially juxtaposing said pair of rotor members to confront said pair of faces with one another, and pairing said respective pluralities of grooves with one another;

disposing in each pair of said pluralities of grooves radially elongate ceramic elements;

during said pair of rotor members axially toward one another to trap said ceramic elements in said paired grooves therebetween;

spacing apart said pair of faces with said ceramic elements, while employing said elements to maintain coaxial an axially spaced parallel alignment of said rotor members;

said ceramic elements to transmit torque between said pair of rotor members; and further including the step of limiting contact between said ceramic elements and said rotor members to essentially line contact.

9. A method of coupling a pair of axially adjacent ceramic rotor members in axially spaced parallel and coaxial torque transmitting relationship, said method including the steps of:

defining on each of said pair of rotor members an axially disposed face circumscribing the rotational axis thereof;

forming on each of said pair of faces a respective plurality of circumferentially spaced apart radially extending grooves which are positionally matching one face to the other;

axially juxtaposing said pair of rotor members to confront said pair of faces with one another, and pairing said respective pluralities of grooves with one another;

disposing in each pair of said pluralities of grooves radially elongate ceramic elements;

during said pair of rotor members axially toward one another to trap said ceramic elements in said paired grooves therebetween;

spacing apart said pair of faces with said ceramic elements, while employing said elements to maintain coaxial and axially spaced parallel alignment of said rotor members;

employing said ceramic elements to transmit torque between said pair of rotor members;

including the step of limiting contact between said ceramic elements and said rotor members to essentially line contact; and further including the steps of forming each of said plurality of ceramic elements to a circularly cylindrical shape having a determined diameter, and forming each of said plurality of grooves to a semi-circular shape defining a radius closely approximate to but less than one-half said determined diameter.

10. The method of claim 9 wherein said step of urging said pair of rotor members axially toward one another includes the steps of forming a central axially extending bore in each one of said pair of rotor members, disposing an elongate tensile member in said bore, applying a tensile force to said tensile member, and reacting said tensile force on said pair of rotor members, thereby to urge the latter axially together.

11. A rotor member for a combustion turbine engine including a compressor inducting ambient air and delivering the air pressurized to a combustor, means for mixing fuel with the pressurized air in said combustor to support combustion producing a flow of high temperature pressurized combustion products, and a turbine expanding said combustion products toward ambient, said rotor member comprising a ceramic first turbine rotor portion and an axially adjacent ceramic second turbine rotor portion, said rotor portions each defining a respective axially extending central bore, a metallic tensile member disposed in said central bore and providing tensile force to the remainder of said rotor member, said rotor member including means for reacting said tensile force to compressively bias said rotor portions toward one another, and said rotor portions defining integral cooperating coupling means dependent upon said compressive bias for coaxial and axially spaced parallel alignment of said rotor portions while coupling the latter for torque transmitting corotation, wherein said coupling means includes each of said rotor portions defining a respective annular axially disposed force circumscribing said respective central bores and said faces confronting one another in axially spaced relation, each of said annular faces defining a respective circumferentially spaced plurality of radially extending grooves, each groove on each annular face aligning axially with a groove on the other annular face to define groove pairs, including a plurality of radially elongate ceramic elements each disposed in a respective one of said groove pairs and axially spacing apart said rotor portions, each one of said plurality of ceramic elements defines only radially extending line contact with each of said rotor portions, said ceramic elements and said rotor portions otherwise being spaced from one another.

12. The invention of claim 11 wherein each of said radially extending grooves is of semi-circular shape defining a radius less than but closely approximating one-half the diameter of the circularly cylindrical ceramic element received therein.

* * * * *

UNITED STATES PATENT AND TRADEMARK OFFICE
CERTIFICATE OF CORRECTION

PATENT NO. : 5,031,400

DATED : 7/16/91

INVENTOR(S) : Gary L. Boyd

It is certified that error appears in the above-identified patent and that said Letters Patent is hereby corrected as shown below:

Column 6:
Claim 6  Line 3, Delete "bores", insert "bore".

Claim 8  Line 1, Delete "prior", insert "pair".

Column 7:
Claim 8  Line 18, Delete "during", insert "urging".

Claim 8  Line 23, Delete "an", insert "and".

Claim 8  Line 25, insert "employing" before "said ceramic elements".

Claim 9  Line 34, Delete "during", insert "urging".

Column 8:
Claim 11  Line 42, insert "wherein" between "portions," and "each one".

Signed and Sealed this

Third Day of November, 1992

Attest:

DOUGLAS B. COMER

Attesting Officer

Acting Commissioner of Patents and Trademarks